United States Patent [19]

Egretier

[11] 4,238,511
[45] Dec. 9, 1980

[54] METHOD AND APPARATUS FOR MACERATION AND FERMENTATION OF GRAPES IN THE PRESENCE OF CARBON DIOXIDE

[76] Inventor: Michel Egretier, 12 Quai Victor Hugo, 11100 Narbonne, France

[21] Appl. No.: 908,425

[22] Filed: May 22, 1978

[30] Foreign Application Priority Data

May 26, 1977 [FR] France ................................. 77 17294

[51] Int. Cl.$^2$ ............................................. C12G 1/00
[52] U.S. Cl. ..................................... 426/15; 426/238; 426/474; 426/477; 426/484; 426/489
[58] Field of Search ................. 426/15, 238, 518, 237, 426/484, 489, 474, 477; 99/276, 277.1, 277; 241/2, 5, 14

[56] References Cited

U.S. PATENT DOCUMENTS 3,741,770  6/1973  Van Olphen ........................ 426/15

FOREIGN PATENT DOCUMENTS 2293867  7/1976  France .
2311843 12/1976  France .

*Primary Examiner*—S. Leon Bashore
*Assistant Examiner*—Peter Chin
*Attorney, Agent, or Firm*—Dowell & Dowell

[57] ABSTRACT

A method and apparatus for macerating and fermenting grapes in the presence of carbon dioxide, the picked grapes being put in a hopper in clusters and fed therefrom by a screw conveyor to an intermittently pulsating pump located below a fermentation vat being filled, and carbon dioxide being drawn from this vat, and others in the installation, and reinjected into the mixture of partially crushed grapes and their must as it is being conducted in a pipe from the pump upwardly into the vat against the back-pressure of the contents therein.

2 Claims, 4 Drawing Figures

METHOD AND APPARATUS FOR MACERATION AND FERMENTATION OF GRAPES IN THE PRESENCE OF CARBON DIOXIDE

BACKGROUND AND PRIOR ART

Prior-art processes have certain advantages, but on the other hand it is also true that they include a number of disadvantages. The feeding of a grape harvest into fermentation vats presents certain problems which are difficult to solve. The fermentation itself requires precaution, above all there being the risk that it will result in the introduction of acid or, in any event in a volatile acidity which is relatively high.

The introduction of acid is the result of secondary fermentation in the presence of glucose, the natural sugar of the grape, which takes place after alcoholic fermentation in the lower layers of the vat where the weight of the contents crushes the grape berries, thereby immediately starting the alcoholic fermentation and making it difficult for the upper layers to achieve intracellular fermentation, i.e. anaerobic metabolism. Stated otherwise, fermentation is not uniform throughout the height of the vat, so that in order to avoid producing an under-fermented product, it becomes necessary to run the risk of the aforementioned acid introduction.

It should also be noted that the particular flavor from aromatic vines is not always present in the resulting wines obtained by prior-art processes of carbonated maceration.

THE INVENTION

The present invention relates to a method and apparatus for maceration of grapes in the presence of carbon dioxide, in which clusters of unsqueezed grapes are discharged into fermentation vats which have been previously filled with carbon dioxide gas.

This invention seeks to provide a process and apparatus for maceration and carbonation which is improved for the purpose of eliminating the above stated disadvantages.

According to this invention, before introducing the grape harvest into a peeler or into the fermentation vat, the berries are detached from the stems at the level of the pedicels in such a manner that the berries thus detached can liberate a fraction of the must which they contain and which then surrounds them with a mass of incompressible liquid which also protects them from crushing while they are moved toward the vat and while in the interior thereof.

Moreover, the must which is thus liberated, and which represents only a small part of the total liquid volume, about 5%, will blend almost completely in the vat with the yeast and be very rapidly transformed into an alcoholic solution in which the berries are macerated. This type of maceration, which adds to the intracellular fermentation of the berries, gives surprising results as compared with other methods of vinification.

According to another aspect of the invention, carbon dioxide gas is inserted into the pipe carrying the macerating grape mixture to the vat, preferably by use of a pump disposed ahead of the entrance to that pipe. Thus, one protects the mixture of detached berries and the liberated must from any oxidization tendency at the same time saturating it with carbon dioxide, which permits reducing to a considerable extent the formation of sulphurous gas.

A particular apparatus suitable for performing the above process is set forth, comprising essentially the combination of a volumetric pump having an integral passage for receiving entire clusters of grapes from a conveyor screw whose blades move progressively in the direction of the entrance opening of the pump, in a manner such that the bunches of grapes are conveyed to the latter by a pure translatory motion and without compression, the mixture which eventually feeds the pump itself arriving directly from a hopper on top of the rotating screw. The separation of the berries from the stems is then assured by intermittent pulsating mechanical shock which occurs in the body of the pump at the instant when its working space which is initially closed with respect to the grapes fed by the screw, then isolated therefrom, is suddenly joined to the discharge pipe in which there exists a considerable hydrostatic back-pressure because of the difference in level between the exit of said pipe and the pump itself. Frictional resistance of the mixture along the discharge pipe also helps to separate the berries from the stems.

Concerning the injection of carbon dioxide gas, this is advantageously accomplished with the aid of an injector fed by a compressor whose intake is connected to tubing coupled to receive gas discharged from the vats as a result of fermentation therein. Of course, for the purpose of filling the first vat, gas can perhaps be furnished from a bottle or other appropriate reservoir.

Analysis of wines obtained by the process according to the invention shows in general an increased depth of color, the improvement being as much as 200%, and at the same time shows a noticeable diminution in volatile acid and metallic content. Sensory examination following the method of Kramer shows a significant preference on the part of tasters for these types of wines as compared with those resulting from vinification beginning with mashing or peeling.

The following gives a working example providing better understanding of the invention, the characteristics which it provides and the advantages which it is capable of procuring.

THE DRAWINGS

Figure 1:
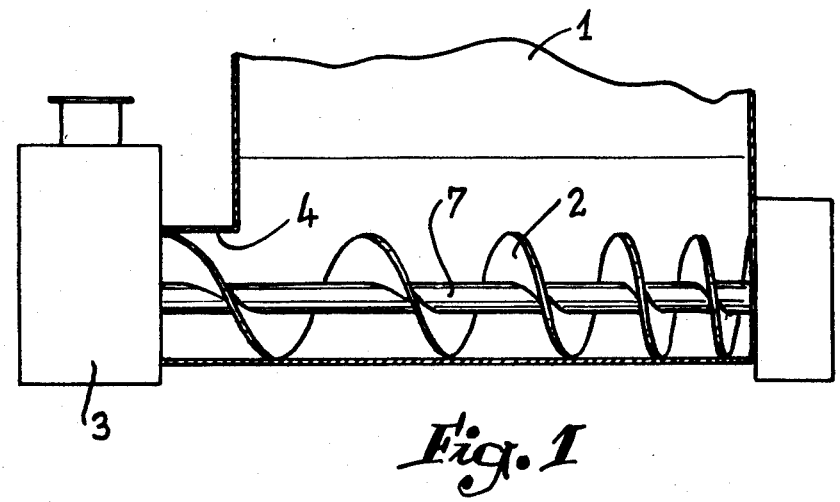
FIG. 1 is a longitudinal sectional view taken through apparatus including a hopper, an Archimedean screw conveyor and a volumetric pump for use in performing the process according to the present invention.

FIG. 1 shows the combination of a bulk hamper 1, an Archimedean conveyor screw 2, and a volumetric pump 3 connected as set forth in French patent application No. 72.36241, filed Oct. 10, 1972 in the name of the present applicant, but with the important difference that the screw conveyor 2 is at right angles to the direction of the pump 3, the end of its helix thus making a very open angle with the transverse plane of entry of the pump. It is to be understood that for this reason the harvested grapes are never compressed between the successive convolutions of the helical screw and therefore arrive at the pump after a purely translatory movement. It should be further noted that the length of the tubular sleeve 4 which connects the hopper 1 with the pump 3 is extremely reduced to a length which is small as compared with one convolution of the screw, so that in fact the screw will never be able to overfeed the pump, but rather will feed it at a rate which is slightly insufficient, the necessary feeding quantity departing from the hopper and passing directly through the very short sleeve 4 as mentioned above.

Figure 2:
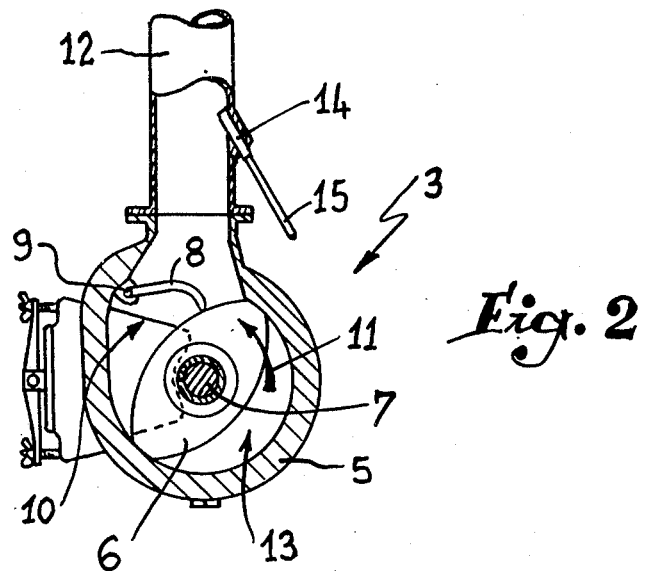
FIGS. 2 and 3 are transverse cross-sectional views taken through the pump in two successive positions of its rotor.
Figure 3:
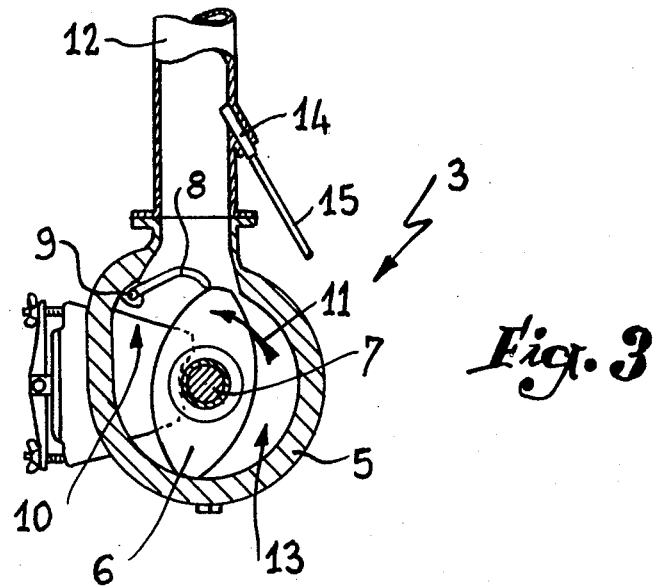

The cross-section of FIG. 2 shows the internal structure of the pump 3. The latter comprises a fixed housing 5, and a rotor 6 having the shape of an elongated ellipse and directly mounted on the shaft 7 of the screw. A valve taking the form of a plate 8 pivoted at 9 has a free edge forming a scraper against the periphery of the rotor 6. The reference character 10 refers to an opening having a large cross-section which connects the interior of the pump with the sleeve 4. When the rotor turns in the direction of the arrow 11, the space located below the valve plate 8 becomes filled, and then the mixture of grapes which has thus entered the pump becomes entrained by the rotor, isolated from the entrance opening 10, and finally compressed into the transport pipe 12 which discharges into the fermentation vat being filled. Considering now the successive positions shown in FIGS. 2 and 3, it will be seen that the space 13 which the rotor 6 has just isolated from the entrance opening 10 is abruptly opened into communication with the discharge pipe 12 in which there exists a considerable hydrostatic pressure as a result of the fact that the pump is essentially located on the ground so that the fermentation vat is higher. Then apparently there occurs a shock wave, and experience shows that the wave is sufficient to detach the berries from their pedicels. In this way, a fraction of the must which has been formed by the berries leaves the latter through the opening thus accomplished, in such a way that the mixture compressed in the pipe 12 appears in the form of a mass of berries surrounded by incompressible liquid which eliminates all possible crushing of the berries themselves which are located within the pipe 12, itself located at the bottom of the vat. The conditions necessary to accomplish the overall process have been well fulfilled.

Figure 4:
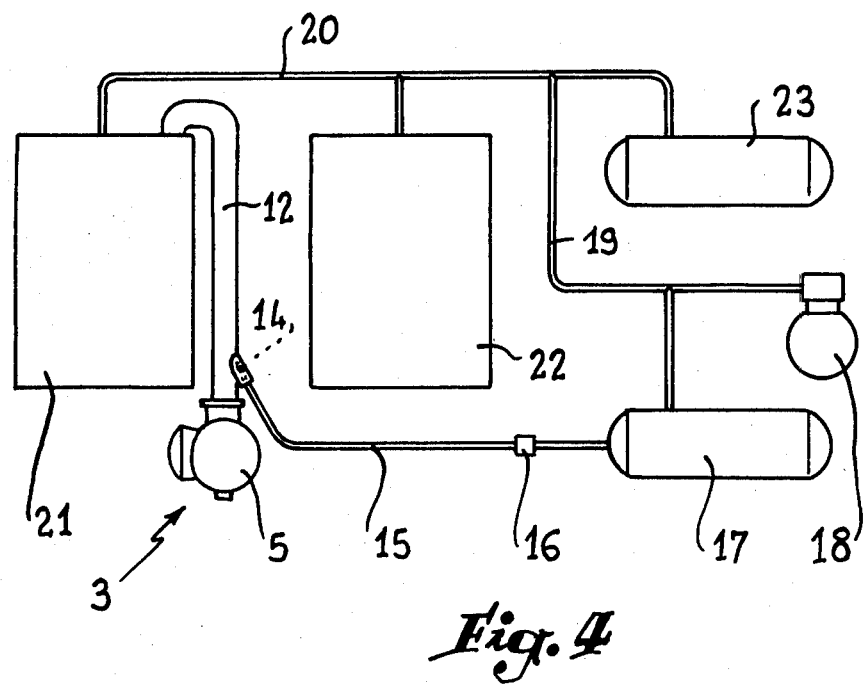
FIG. 4 is a general schematic diagram showing a carbon dioxide gas circuit installed in connection with a fermentation vat arranged according to the invention.

As shown, near to the exit of the pump 3, the pipe 12 is equipped with an injector 14. As can also be seen in FIG. 4, the injector is fed by a tube 15 provided with a regulating valve 16 coming from a reservoir 17 pressurized with carbon-dioxide gas. This gas is compressed in the reservoir 17 by compressor 18 whose suction is connected by a tube 19 to a general collection tube 20 which receives carbon-dioxide gas from all of the fermentation vats in the installation being considered. In FIG. 4 it has been assumed that there are only two vats 21 and 22, the first in the process of being filled via the pipe 12 and the second being already filled and in the course of fermentation, although in actuality in any important winery installation the number of vats would be quite large. There is illustrated at 23 a kind of inflatable container connected to the common tube 20 which forms an accumulator, such that the compressor need only function from time to time to pump gas thus accumulated and compress it into the reservoir 17, the state of inflation of the container being detected by an appropriate transducer (not shown).

It is thus apparent that one can achieve very simply the injection of carbon-dioxide gas into the pipe 12 which ends in the fermentation vat 21 during the process of filling the vat, as suggested in the aforementioned process. Of course, the pipe 12 is common to all of the fermentation vats of the installation, appropriate valve means (not shown) permitting the selective connection to each one thereof.

It should also be understood that the above description was given only by way of example and that it does not in any way limit the scope of the invention, whose various details can be replaced by other functional equivalents.

I claim:

1. The method of macerating and fermenting grapes in the presence of carbon dioxide wherein the berries are detached from the stems in such a fashion that during de-stemming the berries liberate a fraction of the must which they contain and the berries become surrounded by a substantially incompressible mass of the liberated must, the method being characterized by forcing the berries with stems attached toward a fermentation vat by intermittently pumping them against a carbon dioxide back-pressure existing in the fermentation vat in such a manner that they are subjected to pulsating pressures of compression taking the form of shock waves, thereby to de-stem the berries and as a result thereof liberate a small but sufficient portion of their must to prevent crushing of the berries.

2. The process as claimed in claim 1, characterized in that carbon dioxide gas is injected into the grape and must mixture between the pumping step and the fermentation vat immediately downstream thereof to saturate the must with the aforesaid gas under pressure.

* * * * *